UNITED STATES PATENT OFFICE.

WOLFGANG A. MARTIN, OF PITTSBURG, PENNSYLVANIA.

IMPROVEMENT IN COMPOSITIONS FOR INFUSIONS AND BEVERAGES.

Specification forming part of Letters Patent No. 170,286, dated November 23, 1875; application filed October 5, 1875.

*To all whom it may concern:*

Be it known that I, WOLFGANG A. MARTIN, of Pittsburg, in the county of Allegheny and State of Pennsylvania, have invented a new and useful Improvement in Compositions for Beverages; and I do hereby declare the following to be a full, clear, and exact description thereof.

My invention relates to the manufacture of a compound to be used as a coffee substitute or surrogate.

The compounds heretofore manufactured to take the place of coffee have generally been objectionable, either because they contained ingredients which, if used continuously, produced injurious effects upon the system, or because the substances employed made the article produced nearly, if not fully, as expensive as the article for which the compound was substituted. In overcoming these objections I make use, in a compound from which an infusion or beverage is to be made, of ingredients, hereinafter named, which, while giving the desired strength and flavor to the decoction made therefrom, yet are of such a nature that a continuous use may be made of the compound without other than a beneficial effect.

My invention, therefore, consists in a compound containing figs and "St. John's bread," which may be used alone or together with adjuvants, such as roasted grain and like material.

In making my improved compound I take figs and the fruit of the ceretonia, commonly known as St. John's bread, in the proportions of nine (9) pounds of figs to one pound of St. John's bread. These are both dried in any suitable manner, as, for instance, in an oven, until sufficient moisture has been driven off, when they are ground together in the same manner as spices or coffee, until about as fine as coffee usually is just before use.

This compound I use in the same manner and in about the same proportions as coffee. It may also be used with regular coffee, in any proportion desired.

The beverage made from this compound is noticeable for both its strength and flavor, the aroma and taste thereof being exceedingly pleasant, and resembling very greatly the beverage made from coffee. It is also very healthful and beneficial to the system, and leaves behind none of those deleterious effects common to the compounds heretofore used.

Having thus described my invention, what I claim, and desire to secure by Letters Patent, is—

A composition containing figs and the fruit of the ceretonia, substantially as and for the purpose described.

In testimony whereof I, the said WOLFGANG A. MARTIN, have hereunto set my hand.

WOLFGANG A. MARTIN.

Witnesses:
J. H. CALLAHAN,
JAMES I. KAY.